(No Model.)

J. H. WHITAKER.
HARNESS.

No. 350,854. Patented Oct. 12, 1886.

WITNESSES:
Fred. G. Dieterich
Edw. W. Byrn.

INVENTOR:
Jno. H. Whitaker
BY Munn & Co
ATTORNEYS.

UNITED STATES PATENT OFFICE.

JOHN H. WHITAKER, OF DAVENPORT, IOWA.

HARNESS.

SPECIFICATION forming part of Letters Patent No. 350,854, dated October 12, 1886.

Application filed February 23, 1886. Serial No. 192,943. (No model.)

*To all whom it may concern:*

Be it known that I, JOHN H. WHITAKER, of Davenport, in the county of Scott and State of Iowa, have invented a new and useful Improvement in Harness, of which the following is a description.

Figure 1:
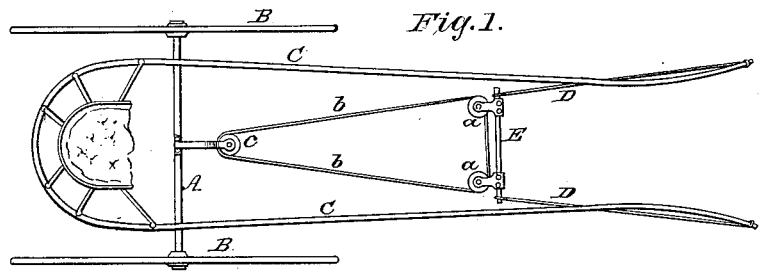
Figure 2:
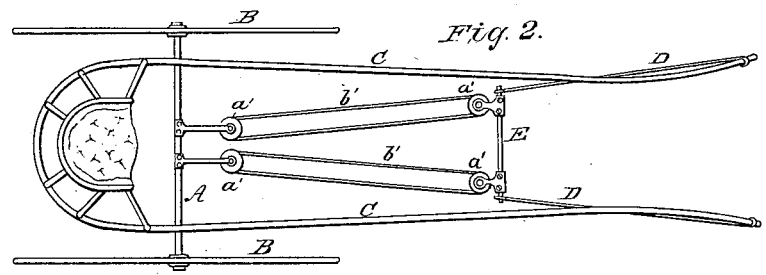
Figure 3:
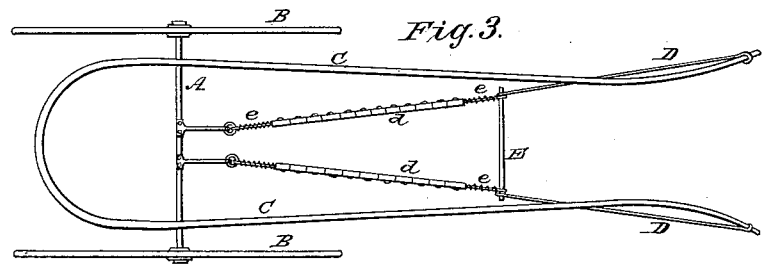
Figure 5:
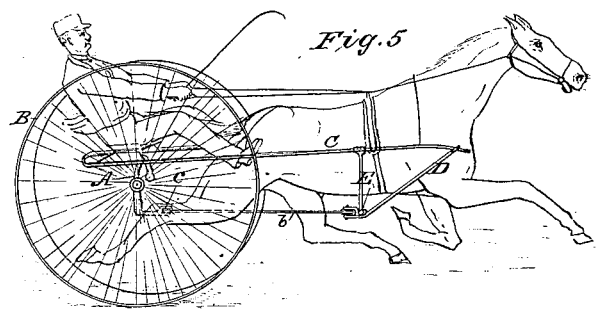
Figure 4:
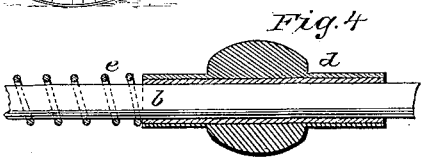

Figure 1 is a plan view of the harness applied to a trotting-sulky. Figs. 2 and 3 are similar views of modified forms of the invention. Fig. 4 is an enlarged sectional detail of the form shown in Fig. 3. Fig. 5 is a side view of the invention as shown in Fig. 1, showing the relation of the same to the horse and the sulky.

My invention is in the nature of an improvement upon the harness for training horses which was patented by me February 16, 1886. The object of that construction was to compel the horse in trotting to throw his hind feet outside of the line of the fore feet, thus enabling him to make a longer stride and avoid striking his fore feet with the hind ones. To that end I employed a pair of converging lines which extended beneath the horse's belly and between his two hind legs in such manner that when trotting the horse would be obliged to step with his hind feet wide apart to avoid striking his hind legs against the converging lines, and thus keep his hind feet out of the range of his fore feet. In that case it was proposed to avoid chafing and rubbing the horse's legs by padding them. My present invention obviates the necessity of this by arranging the lines, or bearing-surfaces on the lines, to have a slight movement along with the horse's leg without rasping it when the latter comes in contact with them, which I will now proceed to describe.

In the drawings, A represents the axle, B B the wheels, and C C the shafts, of an ordinary trotting-sulky or other vehicle. From the front ends of the shafts are extended the two converging lines D D, which pass outside of the horse's fore legs to a cross-brace, E, beneath the horse's belly, as in my former patent referred to. Instead, however, of extending these lines straight to the axle of the vehicle, between the horse's hind legs, as in my said patent, I construct the portions of the lines between the horse's legs so that they will move longitudinally when the horse's leg comes in contact therewith, as follows:

To the rear of the brace E, I attach two pulleys, *a a*, and around them I pass an endless line or belt, *b*, which converges to and passes around a rear pulley, *c*, which is attached to the axle or other part of the vehicle; or I may, as in Fig. 2, use two independent endless belts, *b' b'*, and two pulleys, *a' a'*, for each; or the lines may converge to and be attached to the axle, as in my previous patent, but have upon them, in the range of contact with the hind legs, tubes or sleeves *d*, Fig. 3, which have spiral springs *e e* in front and rear, and which sleeves slide longitudinally on the lines. In either case the bearing-surface against which the leg strikes has a longitudinal forward and backward movement with the horse's leg when it comes in contact with it, which sufficiently suggests to the horse the necessity of stepping wider with his hind legs, but without any sliding friction and the consequent chafing and rubbing of the skin into sores.

The sliding tubes *d* may be made of metal or other suitable material and be covered with felt or rubber, and they, preferably, have also projections upon the same, as shown, to cause the tube to move more surely with the leg and reduce the liability to the rubbing or sliding of the leg over its surface.

Having thus described my invention, what I claim as new is—

1. The harness herein described, consisting of lines and means, substantially as described, whereby the latter are extended between the horse's hind legs, the said lines having bearing-surfaces, and also means, substantially as described, whereby the latter are adapted to move longitudinally or with the horse's leg when in contact with it, substantially as and for the purpose described.

2. The harness herein described, consisting of lines and means, substantially as described, whereby the latter are extended between the horse's hind legs, the said lines being constructed in the form of one or more endless belts, combined with distending-pulleys, substantially as and for the purpose described.

JOHN H. WHITAKER.

Witnesses:
BYRON WHITAKER,
REUBEN L. NICHOLS.